US012584509B1

(12) United States Patent
Feng

(10) Patent No.: US 12,584,509 B1
(45) Date of Patent: Mar. 24, 2026

(54) STANDING LAMP CONNECTION APPARATUS

(71) Applicant: JM Zengge Lighting Co., LTD.,
Guangdong (CN)

(72) Inventor: Xiaoxiong Feng, Guangdong (CN)

(73) Assignee: JM Zengge Lighting Co., LTD.,
Guangdong (CN)

( * ) Notice: Subject to any disclaimer, the term of this
patent is extended or adjusted under 35
U.S.C. 154(b) by 0 days.

(21) Appl. No.: 19/171,322

(22) Filed: Apr. 6, 2025

(30) Foreign Application Priority Data

Jan. 16, 2025 (CN) .......................... 202520102491.4

(51) Int. Cl.
*F21V 21/116* (2006.01)
*F16B 9/00* (2006.01)
(52) U.S. Cl.
CPC .............. *F16B 9/05* (2018.08); *F21V 21/116*
(2013.01)
(58) Field of Classification Search
CPC .......... F16B 9/05; F21V 21/116; F21V 21/10;
F21V 21/00; F21V 21/06; F21V 21/14
See application file for complete search history.

(56) References Cited

U.S. PATENT DOCUMENTS

| | | | | |
|---|---|---|---|---|
| 4,240,603 | A | * 12/1980 | Chiariello | .............. F16M 11/14 |
| | | | | 248/159 |
| 5,590,957 | A | * 1/1997 | Chen | ........................ F21V 21/26 |
| | | | | 362/427 |
| 5,615,946 | A | * 4/1997 | Yeh | .......................... F21V 21/12 |
| | | | | 362/388 |
| 6,659,616 | B1 | * 12/2003 | Bilotti | ...................... A45B 3/02 |
| | | | | 362/102 |
| 11,125,423 | B2 | * 9/2021 | Hatlem | .................... F21V 21/36 |
| 11,543,105 | B2 | * 1/2023 | Portolani | .............. F21V 21/116 |

* cited by examiner

*Primary Examiner* — Bao Q Truong
(74) *Attorney, Agent, or Firm* — Grant Attorneys at Law
PLLC; Kristin Grant

(57) ABSTRACT

A standing lamp connection apparatus is provided, including
a connecting base and a fastener. The connecting base
defines a vertical through hole for a stand column to pass
through, and a threaded hole perpendicular to the through
hole in a side face of the connecting base. A sliding hole in
fluid communication with the through hole is formed in a
bottom wall of the threaded hole. The fastener is inserted
into the threaded hole, an external thread is disposed on an
outer peripheral wall of the fastener, an end of the fastener
stretches out of the threaded hole and is provided with a
rotary knob while the other end stretches out of the sliding
hole and is provided with a pressing plate, a radial size of the
pressing plate is greater than a diameter of the sliding hole,
and the pressing plate can press firmly against the stand
column.

10 Claims, 5 Drawing Sheets

STANDING LAMP CONNECTION APPARATUS

CROSS-REFERENCE TO RELATED APPLICATION

This application is based on and claims the benefit of priority from Chinese Patent Application No. 2025201024914, filed on Jan. 16, 2025, the entirety of which is incorporated by reference herein.

TECHNICAL FIELD

The present disclosure relates to the technical field of lamps, and in particular, to a standing lamp connection apparatus.

BACKGROUND

At present, a standing lamp usually includes a stand column and a lamp mounted on the stand column. In order to facilitate a user to adjust the height of the lamp, in the existing technology, the lamp is slidingly connected to the stand column through a connecting base, and the position of the connecting base at the stand column is fixed by tightening screws, but the screws easily come out and fall when loosened, making it inconvenient to use.

SUMMARY

The present disclosure aims to alleviate at least one of the technical problems existing in the existing technology. To this end, a standing lamp connection apparatus is proposed, which can prevent an adjustment screw from coming out when being loosened.

According to the present disclosure, a standing lamp connection apparatus is provided, which includes a connecting base and a fastener. The connecting base is provided with a vertical through hole for a stand column to pass through, a threaded hole perpendicular to the through hole is formed in a side face of the connecting base, and a sliding hole in fluid communication with the through hole is formed in a bottom wall of the threaded hole; and the fastener is inserted into the threaded hole, an external thread in cooperation with the threaded hole is disposed on an outer peripheral wall of the fastener, an end of the fastener stretches out of the threaded hole and is provided with a rotary knob while the other end stretches out of the sliding hole and is provided with a pressing plate, a radial size of the pressing plate is greater than a diameter of the sliding hole, and the pressing plate is able to press firmly against the stand column.

According to the above embodiment of the present disclosure, the standing lamp connection apparatus has at least the following beneficial effects.

According to the standing lamp connection apparatus provided by the embodiments of the present disclosure, the fastener is tightened through the rotary knob, such that the fastener pushes the pressing plate to move toward the stand column, and the pressing plate can press firmly against the stand column, thus achieving the position fixation of the connecting base. When it is necessary to adjust the position of the connecting base, the fastener is loosened through the rotary knob, thus loosening the stand column to adjust the position. In this process, since the radial size of the pressing plate is larger than the diameter of the sliding hole, the pressing plate is blocked and cannot continue to move, which effectively prevents the fastener from detaching due to excessive displacement. The standing lamp connection apparatus provided by the embodiments of the present disclosure provides a fastener anti-off design, making users smoother to use the fastener, reducing the inconvenience caused by falling parts, and improving the overall product experience.

According to some embodiments of the present disclosure, the fastener includes a slider and an adjustment screw, the slider being slidable in the sliding hole, an end of the slider stretching out of the sliding hole and being provided with the pressing plate while the other end stretching into the threaded hole and being provided with a jack, where the adjustment screw includes a rotating shaft, an end of the rotating shaft being in snap-in connection with the jack while the other end being provided with the rotary knob, a shaft sleeve being disposed on one side, adjacent to the rotating shaft, of the rotary knob, the rotating shaft being positioned in the middle of the shaft sleeve, and the external thread being disposed on the outer peripheral wall of the shaft sleeve.

According to some embodiments of the present disclosure, two elastic arms are symmetrically disposed at an end, away from the rotary knob, of the rotating shaft, the two elastic arms are able to approach to or be separated from each other, the two elastic arms are able to be inserted into the jack in cooperation with each other, and an inner diameter of the jack gradually decreases in a direction away from the rotary knob.

According to some embodiments of the present disclosure, a first slot is disposed circumferentially around the outer wall of the rotating shaft, a first raised ring is disposed circumferentially around the inner wall of the jack, and the first raised ring is able to be in snap-in connection with the first slot.

According to some embodiments of the present disclosure, the standing lamp connection apparatus further includes a lamp holder, the lamp holder being provided with a mounting cavity with an opening, the mounting cavity being configured to mount a lamp, where a connecting hole in fluid communication with the mounting cavity is disposed on a side wall of the lamp holder, and a plugging shaft is disposed on a side face of the connecting base, and plugged into the connecting hole.

According to some embodiments of the present disclosure, a second slot is disposed circumferentially around the outer wall of the plugging shaft, a second raised ring is disposed circumferentially around the inner wall of the connecting hole, and the second raised ring is able to be in snap-in connection with the second slot.

According to some embodiments of the present disclosure, a stopper is disposed on a side wall, adjacent to the connecting hole, of the mounting cavity, and an end of the stopper extends to a side of the connecting hole to block the plugging shaft.

According to some embodiments of the present disclosure, a first buckle is disposed on a side, away from the stopper, of an end part of the plugging shaft, and the first buckle is able to stretch into the mounting cavity and be buckled to the inner wall of the mounting cavity when the second raised ring is in snap-in connection with the second slot.

According to some embodiments of the present disclosure, a plurality of third slots are evenly spaced in a circumferential direction of the inner wall of the connecting hole, the plurality of third slots extend along an axial direction of the connecting hole, a second buckle is disposed on an outer peripheral wall of the plugging shaft, and the second buckle is able to be in snap-in connection with one of the plurality of third slots.

According to some embodiments of the present disclosure, the plugging shaft is provided with two second buckles, and the two second buckles are symmetrically disposed on both sides of the plugging shaft.

Additional aspects and advantages of the present disclosure will be set forth in part in the description which follows, and in part will be obvious from the description, or may be learned by practice of the present disclosure.

BRIEF DESCRIPTION OF DRAWINGS

The present disclosure is explained further below in combination with drawings and embodiments, in which.

Figure 1:
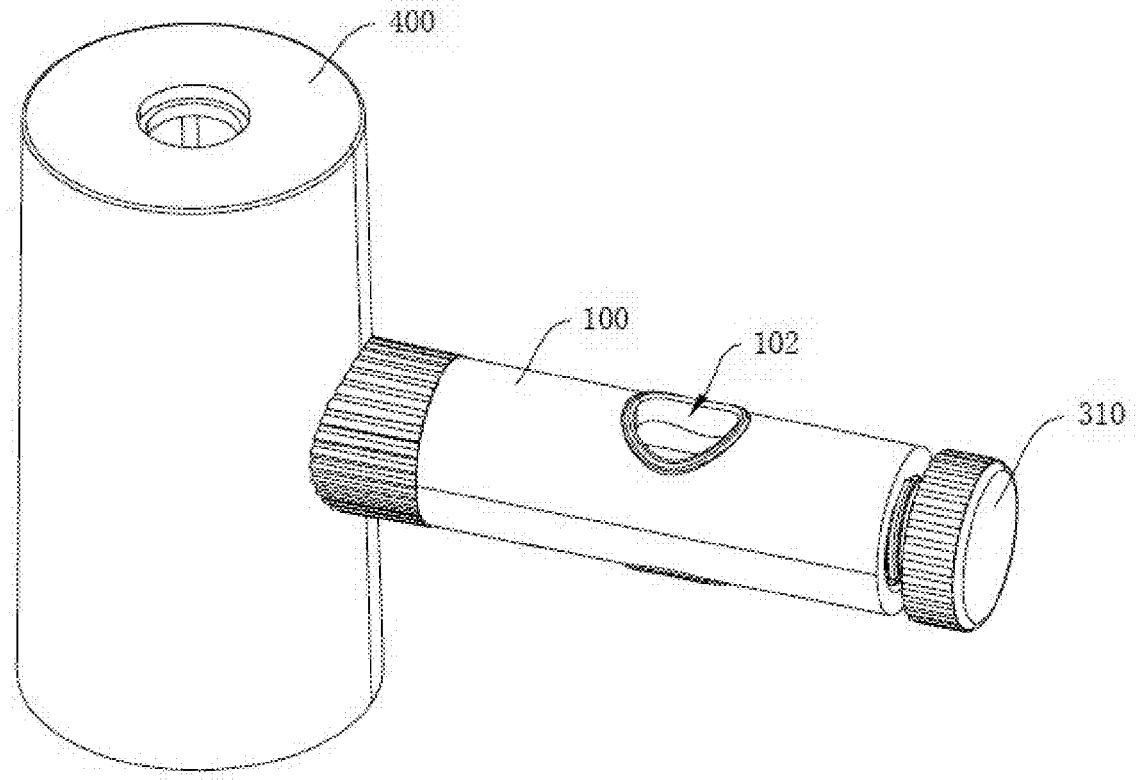
FIG. 1 is a schematic structural diagram of a standing lamp connection apparatus according to some embodiments of the present disclosure.

REFERENCE NUMERALS connecting base 100; inner cavity 101; through hole 102; threaded hole 103; sliding hole 104; wiring hole 105; plugging shaft 110; second slot 111; first buckle 112; second buckle 113;

slider 200; pressing plate 210; jack 220; first raised ring 221;

adjustment screw 300; rotary knob 310; shaft sleeve 320; rotating shaft 330; first slot 331;

lamp holder 400; mounting cavity 410; connecting hole 420; second raised ring 421; third slot 422; and stopper 430.

DETAILED DESCRIPTION

The embodiment of the present disclosure is described in detail below, the example of the embodiment is shown in the drawings, and from beginning to end, the same or similar numerals indicate the same or similar elements or elements with same or similar functionality. The embodiment described with reference to the drawings is illustrative, which is merely used to explain the present disclosure, instead of being understood as a limitation to the present disclosure.

In the description of the present disclosure, it should be understood that orientation or position relationships indicated by the terms such as "up", "down", "front", "rear", "left", "right" and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In the description of the present disclosure, the meaning of "several" is one or more, the meaning of "a plurality of" is two or more, "greater than", "less than", "exceeding" and the like are understood as excluding the specified number, and "above", "below", "within" and the like are understood as including the specified number. The described "first" and "second" are merely used for distinguishing technical features, instead of being understood as indicating or implying relative importance or impliedly indicating the quantity of the showed technical features or impliedly indicating the precedence relationship of the showed technical features.

In the description of the present disclosure, unless specific limitation otherwise, terms "dispose", "install", "connect" and the like should be generally understood. Those of ordinary skill in the art may reasonably determine the specific meaning of the terms in the present disclosure in combination with the specific contents of the technical scheme. In the description of the present disclosure, the descriptions of reference terms "a/an embodiment", "some embodiments", "schematic embodiment", "example", "specific example", or "some examples" mean that the specific characteristics, structures, materials or features described in conjunction with this embodiment or example are included in at least one embodiment or example of the present disclosure. In this specification, the schematic expression of the above terms does not necessarily refer to the same embodiment or example. Moreover, the described specific characteristics, structures, materials or features may be combined in one or more embodiments or examples in a suitable manner. In the description of the specification, the descriptions of reference terms "a/an embodiment", "some embodiments", "schematic embodiment", "example", "specific example", or "some examples" means that the specific characteristics, structures, materials or features described in conjunction with this embodiment or example are included in at least one embodiment or example of the present disclosure. In this specification, the schematic expression of the above terms does not necessarily refer to the same embodiment or example. Moreover, the described specific characteristics, structures, materials or features may be combined in one or more embodiments or examples in a suitable manner.

Referring to FIGS. 1 to 4, a standing lamp connection apparatus proposed according to the present disclosure includes a connecting base 100 and a fastener. The connecting base 100 defines a vertical through hole 102 for a stand column to pass through, and a threaded hole 103 perpendicular to the through hole 102 is formed in a side face of the connecting base 100. A sliding hole 104 in fluid communication with the through hole 102 is formed in a bottom wall of the threaded hole 103. The fastener is inserted into the threaded hole 103, and an external thread in cooperation with the threaded hole 103 is disposed on an outer peripheral wall of the fastener. An end of the fastener stretches out of the threaded hole and is provided with a rotary knob 310 while the other end stretches out of the sliding hole 104 and is provided with a pressing plate 210. A radial size of the pressing plate 210 is greater than a diameter of the sliding hole 104, and the pressing plate 210 can press firmly against the stand column.

It should be appreciated that the standing lamp connection apparatus provided according to the embodiments of the present disclosure tightens the fastener through the rotary knob 310, so that the fastener pushes the pressing plate 210 to move toward the stand column and the pressing plate 210 can press firmly against the stand column, thus achieving the position fixation of the connecting base 100. When the position of the connecting base 100 needs to be adjusted, the fastener is loosened through the rotary knob 310, thus loosening the stand column to adjust the position. In this process, since the radial size of the pressing plate 210 is larger than the diameter of the sliding hole 104, the pressing plate 210 is blocked and cannot continue to move, which effectively prevents the fastener from detaching from the threaded hole 103 due to excessive displacement. The standing lamp connection apparatus provided by the embodiments of the present disclosure provides a fastener anti-off design, making users smoother to use the fastener, reducing the inconvenience caused by falling parts, and improving the overall product experience.

Figure 2:
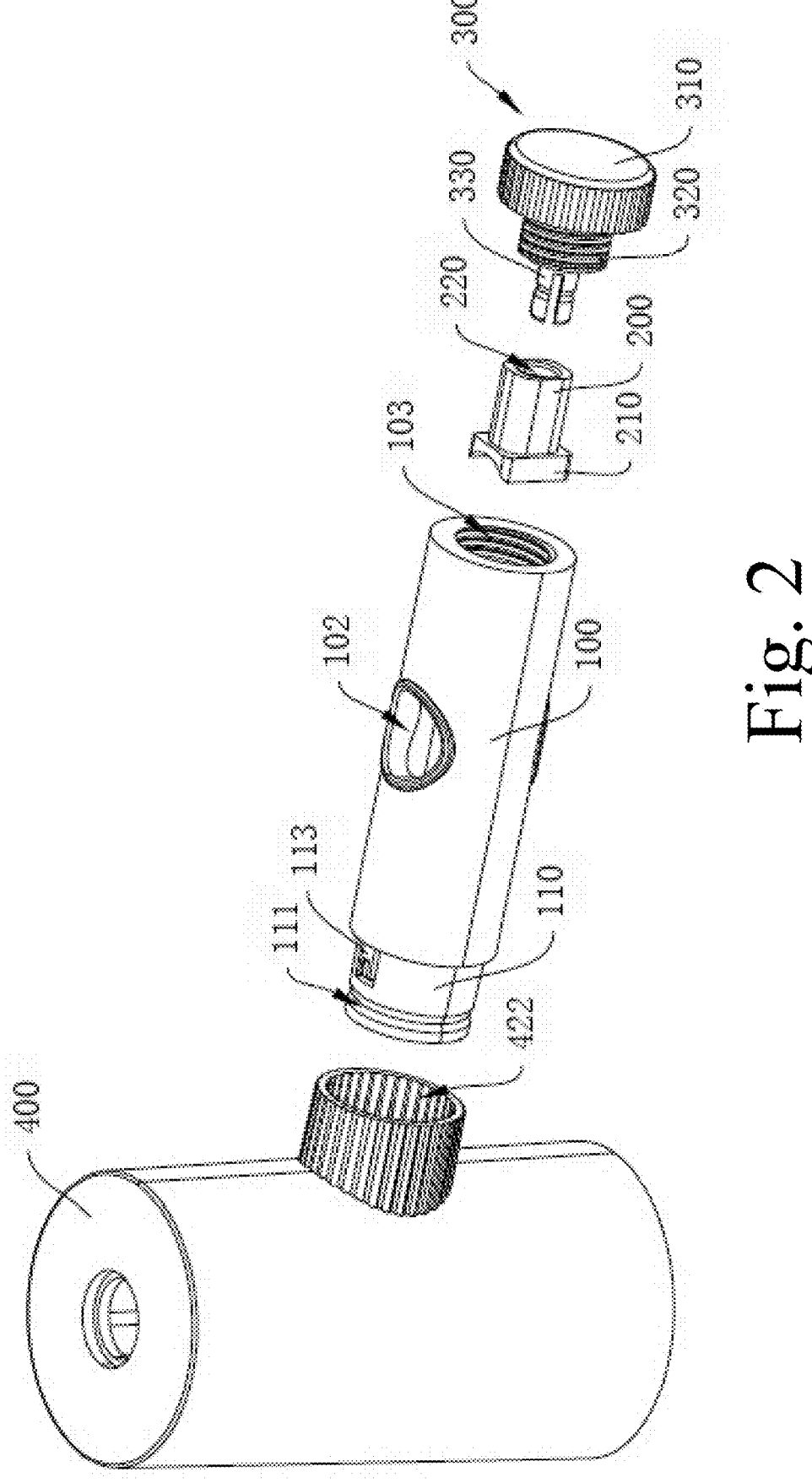
FIG. 2 is an exploded view of a standing lamp connection apparatus according to some embodiments of the present disclosure.
Figure 3:
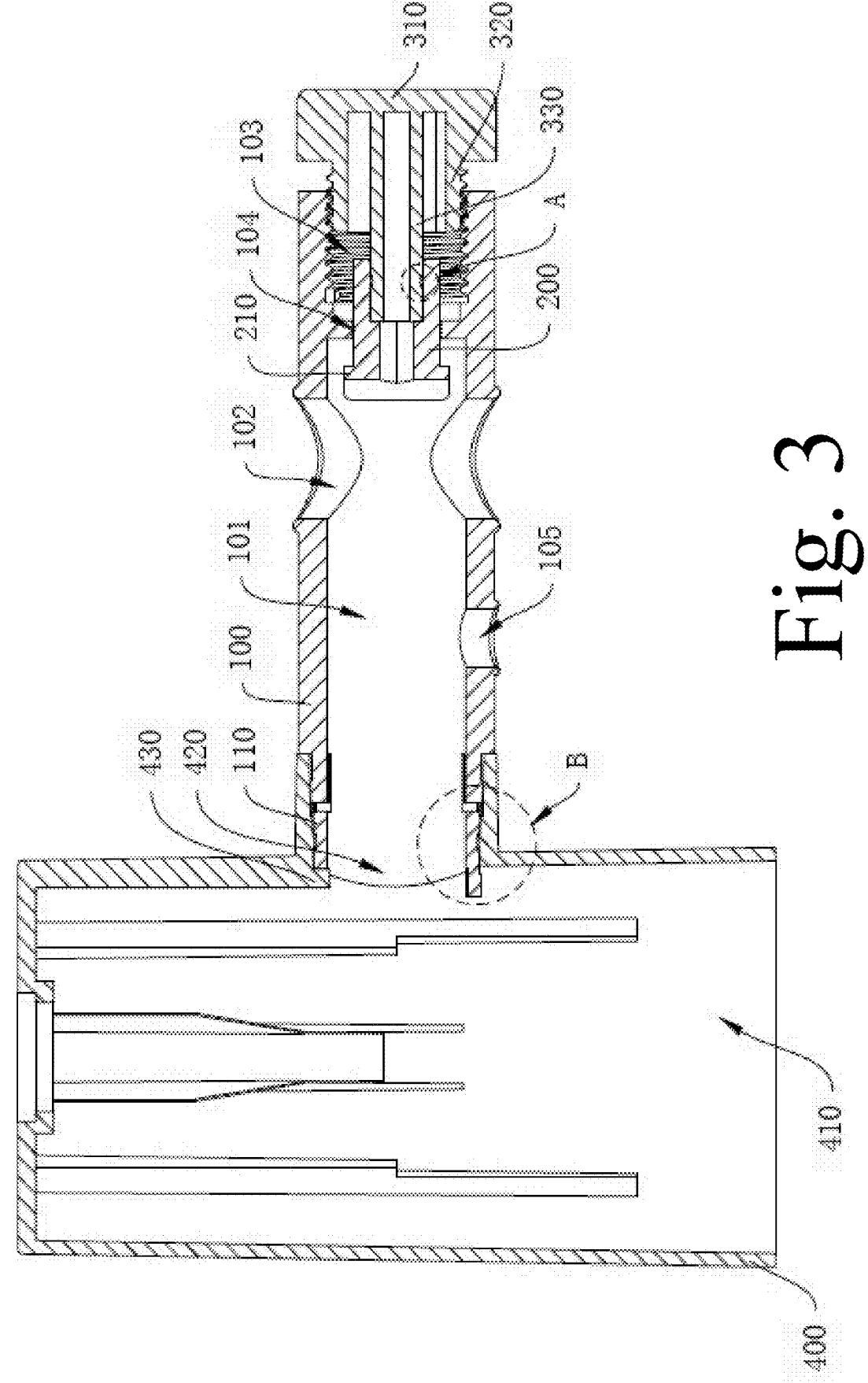
FIG. 3 is a cross-sectional view of a standing lamp connection apparatus according to some embodiments of the present disclosure.
Figure 4:
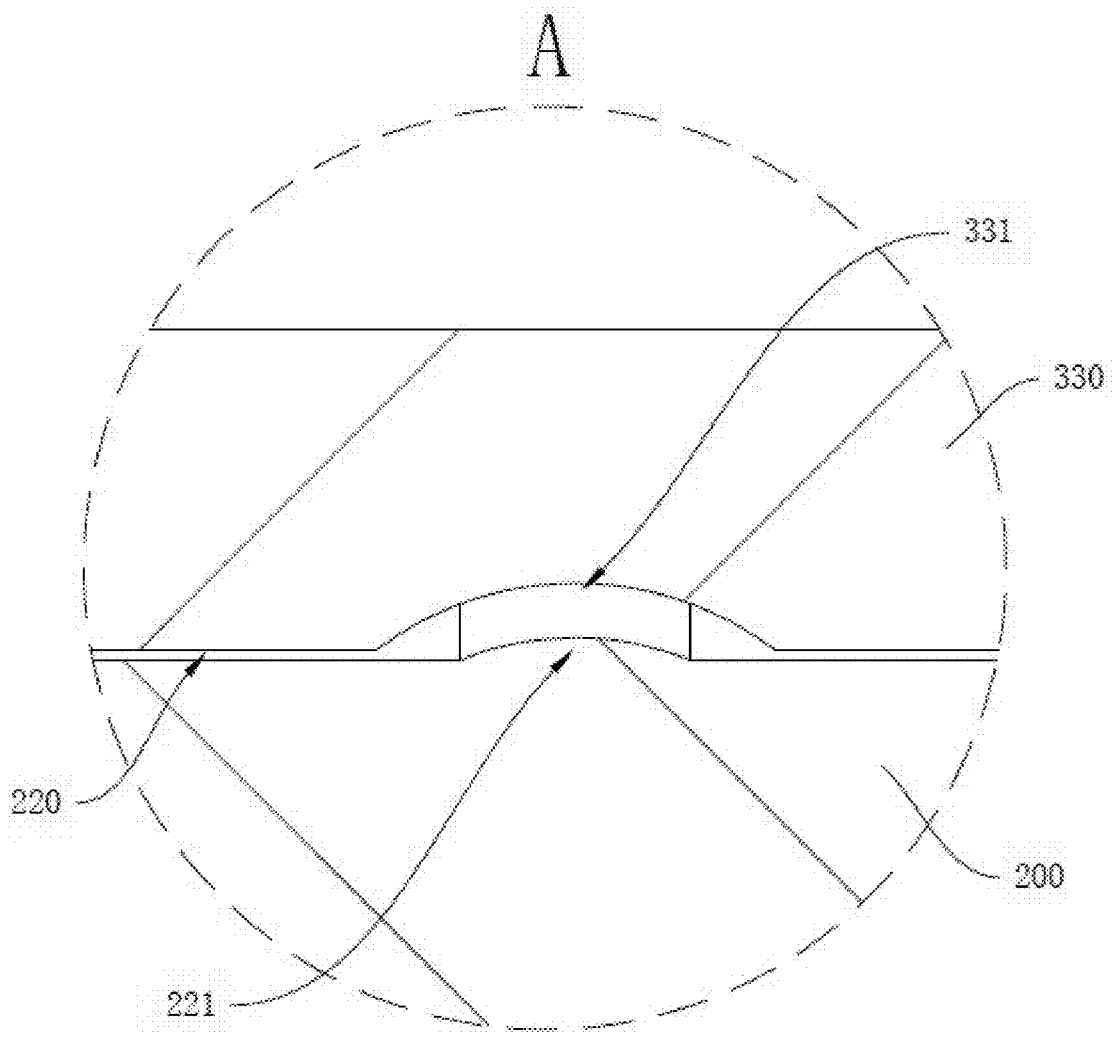
FIG. 4 is an enlarged view of portion A in FIG. 3.

Referring to FIGS. 2-4, according to some embodiments of the present disclosure, the fastener includes a slider 200 and an adjustment screw 300. The slider 200 is slidable in the sliding hole 104. An end of the slider 200 stretches out of the sliding hole 104 and is provided with the pressing plate 210 while the other end stretches into the threaded hole 103 and is provided with a jack 220. The adjustment screw 300 includes a rotating shaft 330, an end of the rotating shaft 330 being in snap-in connection with the jack 220 while the other end being provided with the rotary knob 310, a shaft sleeve 320 being disposed on a side, adjacent to the rotating shaft 330, of the rotary knob 310, the rotating shaft 330 being positioned in the middle of the shaft sleeve 320, and the external thread being disposed on the outer peripheral wall of the shaft sleeve 320.

It should be appreciated that the standing lamp connection apparatus is convenient to disassemble and replace through the assembly fastener. During specific use, the adjustment screw 300 is tightened by rotating the rotary knob 310, so that the shaft sleeve 320 cooperates with the threaded hole 103 through the external thread and the rotating shaft 330 can push the slider 200 to move toward the stand column, then allowing the pressing plate 210 to press firmly against the stand column, thus achieving the position fixation of the connecting base 100. When the position of the connecting base 100 needs to be adjusted, the adjustment screw 300 is loosened by rotating the rotary knob 310. In the loosening process, since the rotating shaft 330 is snap-fit with the jack 220, the rotating shaft 330 can drive the slider 200 to be away from the stand column, thus loosening the stand column. Meanwhile, when the user does not exert too much efforts and the pressing plate 210 cannot continue to move, the snap-fit of the rotating shaft 330 and the jack 220 can provide the user with a stuck feeling to remind the user to stop rotating the rotary knob 310, which effectively prevents the adjustment screw 300 from falling off due to excessive rotation.

Refer to FIGS. 2 to 4, according to some embodiments of the present disclosure, two elastic arms are symmetrically disposed at an end, away from the rotary knob 310, of the rotating shaft 330. The two elastic arms can approach to or be separated from each other, the two elastic arms can be inserted into the jack 220 in cooperation with each other, and an inner diameter of the jack 220 gradually decreases in a direction away from the rotary knob 310.

It should be appreciated that, due to the gradual reduction of the inner diameter of jack 220, the two elastic arms can be stretched out in the jack 220 under the action of elasticity after being inserted into the jack 220, thus enhancing the connecting stability between the slider 200 and the adjustment screw 300.

Referring to FIGS. 2 to 4, according to some embodiments of the present disclosure, a first slot 331 is disposed circumferentially around the outer wall of the rotating shaft 330, a first raised ring 221 is disposed circumferentially around the inner wall of the jack 220, and the first raised ring 221 can be in snap-in connection with the first slot 331.

It should be appreciated that, due to the snap-fit of the first slot 331 and the first raised ring 221, the adjustment screw 300 is capable of driving the slider 200 to move away from the stand column, and an anti-off mechanism achieved between the rotating shaft 330 and the jack 220 through the first slot 331 and the first raised ring 221 can effectively prevent the adjustment screw 300 from accidentally falling off due to excessive rotation.

According to some embodiments of the present disclosure, an arc-shaped surface is provided on a side, adjacent to the stand column, of the pressing plate 210, and the arc-shaped surface adapts to the shape of the stand column, such that the pressing plate 210 can better fit with the surface of the stand column when pressing firmly against the stand column, thus increasing the contact area, reducing local pressure, and improving the overall structural stability.

Referring to FIGS. 1 to 3, according to some embodiments of the present disclosure, the standing lamp connection apparatus includes a lamp holder 400, the lamp holder 400 being provided with a mounting cavity 410 with an opening, the mounting cavity 410 being configured to mount a lamp, where a connecting hole 420 in fluid communication with the mounting cavity 410 is disposed on a side wall of the lamp holder 400, a plugging shaft 110 is disposed on a side face of the connecting base 100, and plugged into the connecting hole 420. It should be appreciated that the cooperation of the plugging shaft 110 and the connecting hole 420 achieves the connection and increases the mounting flexibility and convenience.

Referring to FIGS. 2 to 5, according to some embodiments of the present disclosure, a second slot 111 is disposed circumferentially around the outer wall of the plugging shaft 110, a second raised ring 421 is disposed circumferentially around the inner wall of the connecting hole 420, and the second raised ring 421 can be in snap-in connection with the second slot 111, thus enhancing the mounting stability of the lamp holder 400 and at the same time improving the mounting flexibility and convenience through the cooperative engagement of the second slot 111 and the second raised ring 421.

Referring to FIG. 3, according to some embodiments of the present disclosure, a stopper 430 is disposed on a side wall, adjacent to the connecting hole 420, of the mounting cavity 410, and an end of the stopper 430 extends to a side of the connecting hole 420 to block the plugging shaft 110, to avoid the excessive rotation of the plugging shaft 110, play a positioning role, and ensure the smooth cooperative engagement of the second raised ring 421 and the second slot 111.

Figure 5:
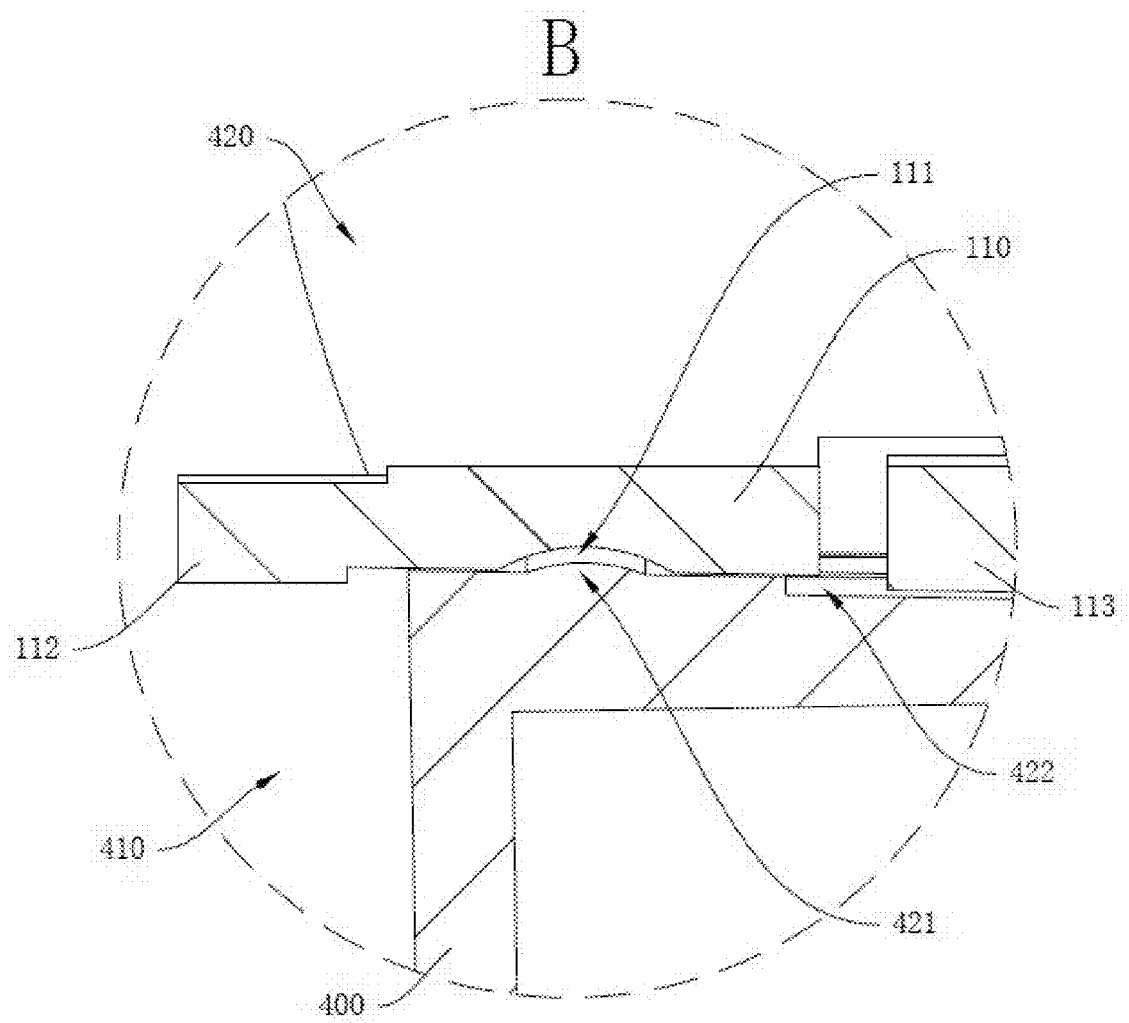
FIG. 5 is an enlarged view of portion B in FIG. 3.

Referring to FIGS. 3 and 5, according to some embodiments of the present disclosure, a first buckle 112 is disposed on a side, away from the stopper 430, of an end part of the plugging shaft 110, and when the second raised ring 421 is in snap-in connection with the second slot 111, the first buckle 112 can stretch into the mounting cavity 410 and be buckled to the inner wall of the mounting cavity 410, thus further enhancing the connecting reliability and reducing looseness caused by vibration or other factors.

Refer to FIGS. 2 and 5, according to some embodiments of the present disclosure, a plurality of third slots 422 are evenly spaced circumferentially around the inner wall of the connecting hole 420, and the third slots 422 extend along an axial direction of the connecting hole 420. A second buckle 113 is disposed on an outer peripheral wall of the plugging shaft 110, and the second buckle 113 can be in snap-in connection with one of the third slots 422.

In some embodiments, during actual use, the lighting angle of the lamp is usually required to be adjusted. By providing the plurality of third slots 422 on the inner wall of the connecting hole 420, when the angle of the lamp needs to be adjusted, the lamp holder 400 is rotated to make the second buckle 113 be buckled into the next third slot 422, with a simple structure and convenient operation.

According to some embodiments of the present disclosure, the plugging shaft 110 is provided with two second buckles 113, and the two second buckles 113 are symmetrically disposed on both sides of the plugging shaft 110, to enhance the connecting stability.

Referring to FIG. 3, according to some embodiments of the present disclosure, the connecting base 100 defines an inner cavity 101, and the plugging shaft 110 communicates with the inner cavity 101 and the mounting cavity 410. A wiring hole 105 in fluid communication with the inner cavity 101 is formed in the outer wall of the connecting base 100, so a wire can enter from the wiring hole 105, extend into the mounting cavity 410 through the inner cavity 101, and is connected to the lamp, thus simplifying the wiring process inside the lamp and making installation and maintenance more convenient and faster.

The embodiments of the present disclosure are described in detail above in combination with the drawings, however, the present disclosure is not limited the above embodiments. Under the premise of not departing from the gist of the present disclosure, various changes can also be made within the knowledge scope of those skilled in the art.

What is claimed is:

1. A standing lamp connection apparatus, comprising:
   a connecting base provided with a vertical through hole for a stand column to pass through, wherein a threaded hole perpendicular to the through hole is formed in a side face of the connecting base, and a sliding hole in fluid communication with the through hole is formed in a bottom wall of the threaded hole; and
   a fastener configured to be inserted into the threaded hole, wherein an external thread in cooperation with the threaded hole is disposed on an outer peripheral wall of the fastener, an end of the fastener stretches out of the threaded hole and is provided with a rotary knob while the other end stretches out of the sliding hole and is provided with a pressing plate, a radial size of the pressing plate is greater than a diameter of the sliding hole, and the pressing plate is able to press firmly against the stand column.

2. The standing lamp connection apparatus according to claim 1, wherein the fastener comprises a slider and an adjustment screw, the slider being slidable in the sliding hole, an end of the slider stretching out of the sliding hole and being provided with the pressing plate while the other end stretching into the threaded hole and being provided with a jack, wherein the adjustment screw comprises a rotating shaft, an end of the rotating shaft being in snap-in connection with the jack while the other end being provided with the rotary knob, a shaft sleeve being disposed on a side, adjacent to the rotating shaft, of the rotary knob, the rotating shaft being positioned in the middle of the shaft sleeve, and the external thread being disposed on an outer peripheral wall of the shaft sleeve.

3. The standing lamp connection apparatus according to claim 2, wherein two elastic arms are symmetrically disposed at one end, away from the rotary knob, of the rotating shaft, the two elastic arms are able to approach to or be separated from each other, the two elastic arms are capable of being inserted into the jack in cooperation with each other, and an inner diameter of the jack gradually decreases in a direction away from the rotary knob.

4. The standing lamp connection apparatus according to claim 2, wherein a first slot is disposed circumferentially around the outer wall of the rotating shaft, a first raised ring is disposed circumferentially around the inner wall of the jack, and the first raised ring is able to be in snap-in connection with the first slot.

5. The standing lamp connection apparatus according to claim 1, further comprising a lamp holder, the lamp holder defining a mounting cavity with an opening, the mounting cavity being configured to mount a lamp, wherein a connecting hole in fluid communication with the mounting cavity is disposed on a side wall of the lamp holder; and a plugging shaft is disposed on a side face of the connecting base, and plugged into the connecting hole.

6. The standing lamp connection apparatus according to claim 5, wherein a second slot is disposed circumferentially around the outer wall of the plugging shaft, a second raised ring is disposed circumferentially around the inner wall of the connecting hole, and the second raised ring is able to be in snap-in connection with the second slot.

7. The standing lamp connection apparatus according to claim 6, wherein a stopper is disposed on a side wall, adjacent to the connecting hole, of the mounting cavity, and an end of the stopper extends to a side of the connecting hole to block the plugging shaft.

8. The standing lamp connection apparatus according to claim 7, wherein a first buckle is disposed on a side, away from the stopper, of an end part of the plugging shaft, and the first buckle is able to stretch into the mounting cavity and be buckled to the inner wall of the mounting cavity when second raised ring is in snap-in connection with the second slot.

9. The standing lamp connection apparatus according to claim 5, wherein a plurality of third slots are evenly spaced in a circumferential direction of the inner wall of the connecting hole, the plurality of third slots extend along an axial direction of the connecting hole, a second buckle is disposed on an outer peripheral wall of the plugging shaft, and the second buckle is able to be in snap-in connection with one of the plurality of third slots.

10. The standing lamp connection apparatus according to claim 9, wherein the plugging shaft is provided with two second buckles, and the two second buckles are symmetrically disposed on both sides of the plugging shaft.

* * * * *